Feb. 28, 1939.  J. R. REYBURN  2,148,502
ANTISKID LUG WELDING MACHINE
Filed Nov. 24, 1937  3 Sheets-Sheet 1
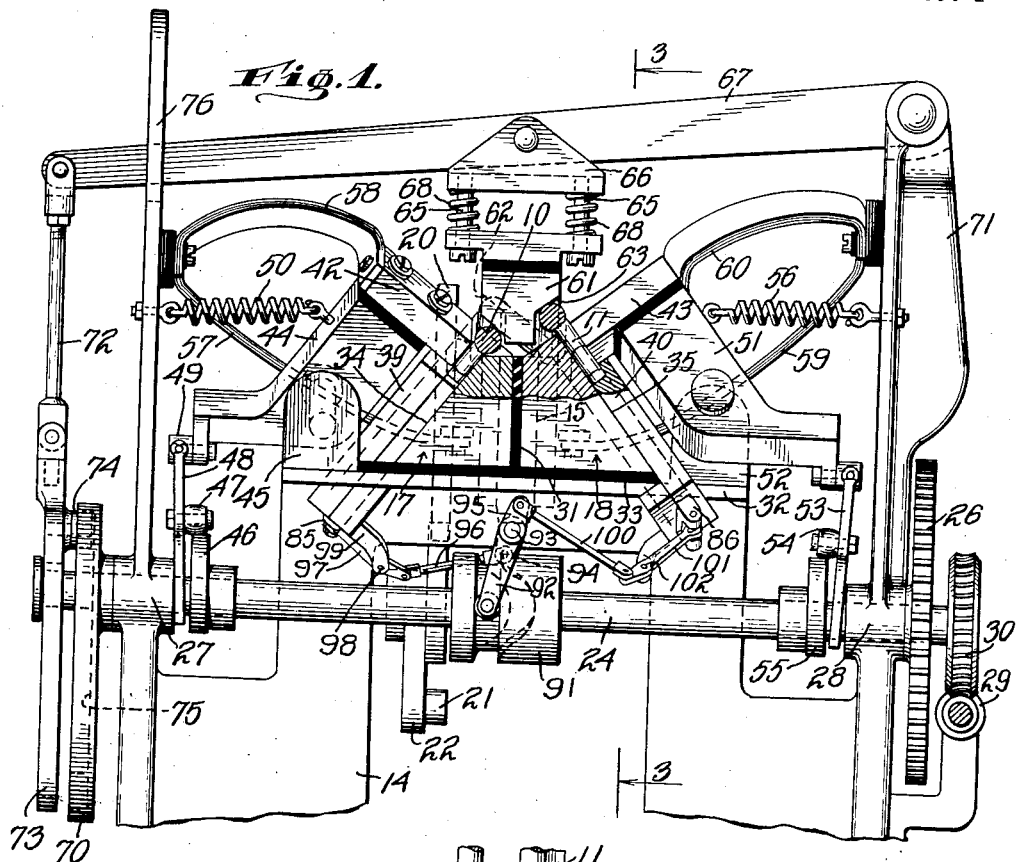
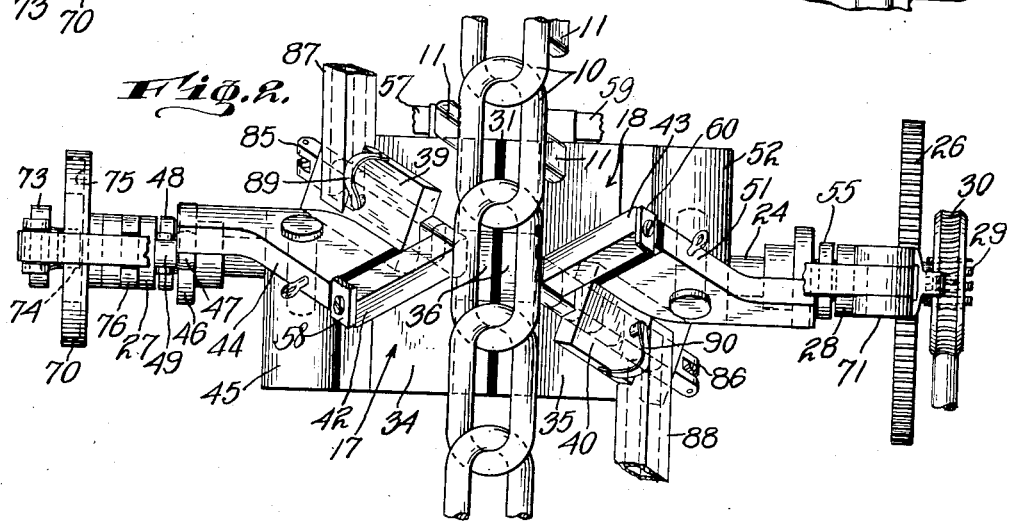
INVENTOR
JOHN R. REYBURN
BY
ATTORNEY

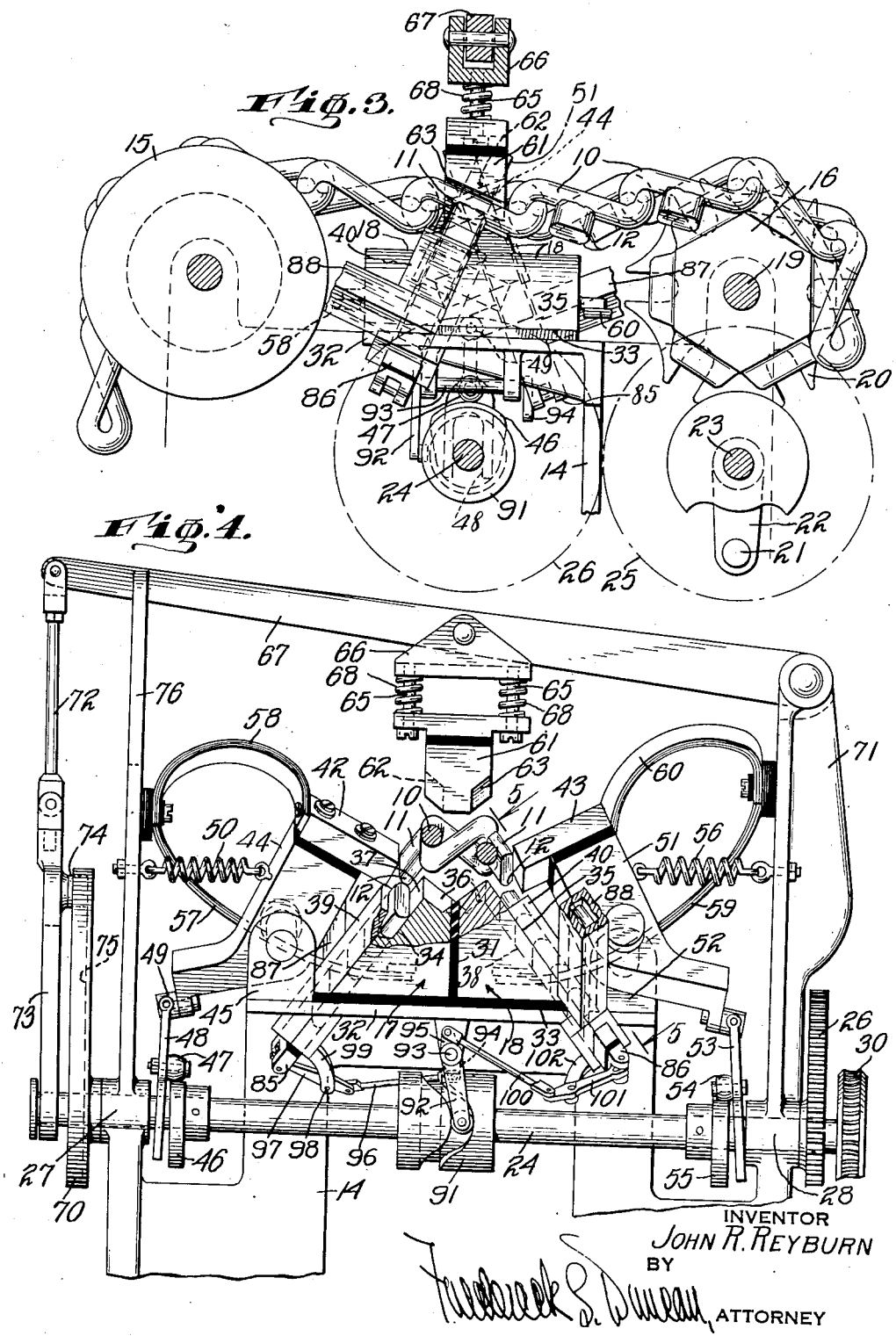

Feb. 28, 1939. J. R. REYBURN 2,148,502
ANTISKID LUG WELDING MACHINE
Filed Nov. 24, 1937 3 Sheets-Sheet 3
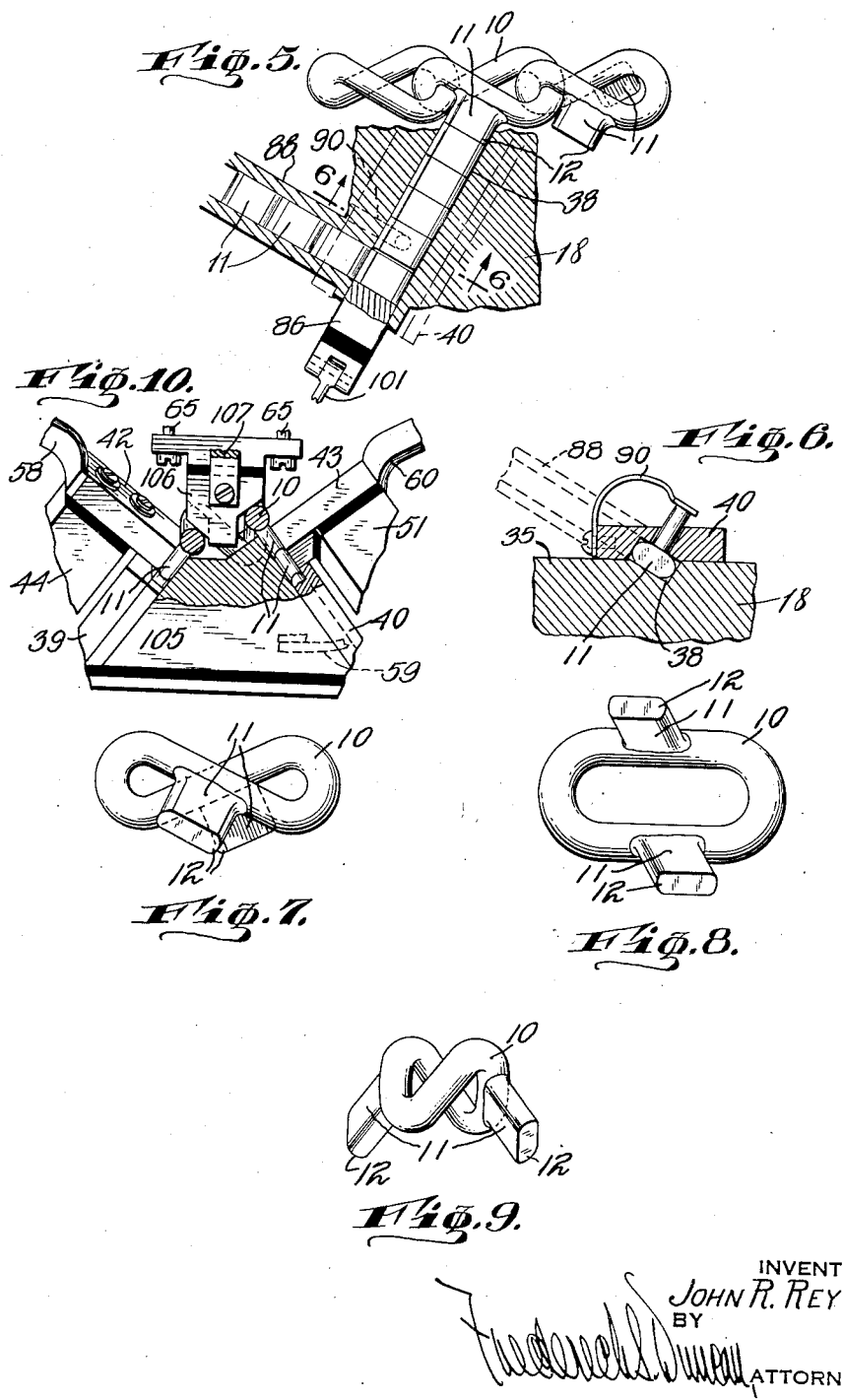
INVENTOR
JOHN R. REYBURN
BY
ATTORNEY Patented Feb. 28, 1939

2,148,502

UNITED STATES PATENT OFFICE 2,148,502

ANTISKID LUG WELDING MACHINE

John R. Reyburn, Fairfield, Conn., assignor to American Chain & Cable Company, Inc., New York, N. Y., a corporation of New York Application November 24, 1937, Serial No. 176,381

24 Claims. (Cl. 219—4)

This invention relates to a machine for welding reinforcements, anti-skid lugs or caulks to cross chains, and this application is a continuation in part of my application Ser. No. 113,537 filed December 1, 1936.

This invention relates to apparatus for electrically welding metal parts together and more particularly for welding anti-skid lugs or caulks to links of a cross chain.

One object of this invention relates to a welding machine for simultaneously welding separate anti-skid lugs or caulks to the side strands of a chain link and more particularly to the oppositely inclined side strands of a curb link.

Another object of this invention is the provision of an apparatus for applying and welding downwardly diverging anti-skid lugs or caulks to links of a chain and more particularly to the oppositely inclined side strands of a curb link.

A more specific object of the invention relates to a welding machine for simultaneously applying and welding downwardly projecting and outwardly flaring anti-skid lugs or caulks to the oppositely inclined side strands of a curb link.

Other objects of the invention will appear from the following description taken in connection with the drawings in which:

Fig. 1 shows my improved welding machine in vertical section viewed in the direction of feed of the chain to which the caulks are to be welded, the parts being shown in welding position;

Fig. 2 is a fragmental top plan view of part of the machine;

Fig. 3 is a section substantially on the line 3—3 of Fig. 1;

Fig. 4 is a view similar to Fig. 1 showing the position of the parts after a pair of caulks has been welded to a link and the parts have been retracted;

Fig. 5 is a sectional view substantially on the line 5—5 of Fig. 4;

Fig. 6 is a sectional view on the line 6—6 of Fig. 5;

Fig. 7 is a view in side elevation of a curb link with the caulks welded thereon;

Fig. 8 is a plan view of the traction side of the link;

Fig. 9 is an end view of the link; and

Fig. 10 is a fragmental view in transverse section of a modified form of machine.

My improved welding machine has been designed to weld anti-skid lugs or caulks or reinforcements to links of a chain to produce a cross-chain which may comprise a set of reinforced curb links 10 such as the link shown in Figs. 7, 8 and 9. These links are preferably confined to the road engaging portion of the cross-chain. Each of said links has a pair of caulks 11 welded thereto. These caulks are preferably elongated rectangular bodies and are welded to the side strands of the link. As shown the caulks are flared outwardly so as to broaden considerably the road bearing width of the link. Each caulk parallels the side strand of the link to which it is welded and presents a sharp corner 12 which serves as a prong to dig into the road.

A machine for welding the caulks to the links is illustrated in Figs. 1 to 4. This machine comprises a main frame 14 on which is mounted a pair of sprocket wheels 15 and 16. A chain of curb links 10 is drawn over the wheel 15 by means of the sprocket wheel 16 so that the chain is stretched taut between these wheels. To this end any well known means (not shown) may be applied to the wheel 15, or to the chain itself to resist the pull of the sprocket wheel 16, so that the chain will normally be held clear of a pair of welding electrodes 17 and 18 disposed midway between the wheels 15 and 16. The wheel 16 is fixed upon a shaft 19 and also fixed on this shaft is a Geneva gear 20 adapted to be operatively engaged by a pin 21 on a drive arm 22 fixed to a shaft 23. The latter is geared to a main driving shaft 24 by a pair of gears 25 and 26. This driving shaft, as shown in Fig. 1, is suitably supported in bearings 27 and 28 carried by the main frame 14 and is supplied with power through a worm and worm wheel 29 and 30.

The electrodes 17 and 18 are separated by a vertical plate 31 of insulation and are supported on a bracket 32 with a plate 33 of insulation material intervening therebetween. The outer side faces 34 and 35 of the electrodes are inclined and slope toward the longitudinal axis of the chain, each forming an angle of about 45 degrees with the bracket 32. At their upper edges the electrodes are cut away to form a recess 36 for the purpose of clearance at the welding point. Formed in the outer faces 34 and 35 of the electrodes are guiding grooves 37 and 38 of triangular cross section. These grooves extend angularly in opposite directions in the faces of the electrodes to guide caulks 11 to present their ends parallel to the oppositely inclined side strands of a curb link. An inclined triangularly grooved guide 39 lies against the face 34 of the electrode 17 and cooperates with the groove 37 to guide caulks 11 as they are fed to welding position. The guide 39 may be secured to the electrode by welding or by any suitable means. Any suitable means may be employed for intermittently feeding the caulks to the welding position. Such a means is shown in Figs. 1 and 4 and will be described hereinafter.

A similar guide 40 lies against the face 35 of the electrode 18 and through this another set of caulks 11 is fed. It will be understood that the caulks in the guide 39 are to be welded to the adjacent side strands of the curb links 10 and the caulks fed through guide 40 are to be welded to the other side strands of the links.

The guides 39 and 40 stop short of the upper end of the electrodes 17 and 18 so that the caulks pass out of the guides as they come successively to welding position. However, the caulks are still held against lateral displacement in the grooves 37 and 38. In this position they will be engaged and held by electrodes 42 and 43.

The electrode 42 is bolted to but insulated from a bell crank lever 44 pivoted on a stud supported in a bearing lug 45 on the bracket 32. The stud and face of the lug are inclined to cause the electrode 42 to travel normal to the side face of the caulk and the bottom of the groove 37. A cam 46 fixed upon the shaft 24 is provided with a peripheral cam face engaged by a roller 47 carried by a link 48 straddling the shaft 24 and pivoted by a universal connection 49 to a depending lug on the rear end of the bell crank lever 44. A tension spring 50 holds the roller 47 engaged with the cam face of cam 46. It will thus be apparent that as the cam 46 rotates from the position shown in Fig. 4 to that shown in Fig. 1, it rocks the bell crank lever 44 and the electrode 42 clockwise to clamp the caulk 11 against the electrode 17 as shown in Fig. 1, and as the cam rotates to the position shown in Fig. 4 the spring 50 will move the electrode 42 away from electrode 17.

The electrode 43 is similarly mounted on a bell crank lever 51 pivoted on a stud carried by a bearing lug 52 whose bearing face is inclined in the opposite direction from that of lug 45. The end of the lever 51 is connected by a universal connection with a link 53 straddling the shaft 24 and carrying a roller 54 bearing on the face of a cam 55. A spring 56 holds the roller in contact with the face of the cam.

Welding current is supplied to the electrodes 17 and 42 through leads 57 and 58 which may be connected to one pole of a source of welding current, while the other pole is connected through leads 59 and 60 to the electrodes 18 and 43, respectively. The welding current is applied at the proper time by any suitable means not disclosed.

As explained above, the chain to which the caulks are to be welded normally lies just above the welding point. When a weld is to be made the chain is depressed by a block 61 which is automatically lowered in predetermined time relation to the operation of the rest of the mechanism. This block 61 is formed of good conducting material and constitutes a neutral electrode in that it is not itself directly connected to a source of electric energy, but merely serves in conjunction with the two ends of the link to pass current from one strand to the other of the link when the welds are made. The block 61 is of such shape that it will enter between the strands of the link and it is formed with oppositely inclined shoulders 62 and 63 arranged to provide parallel bearings on the opposite side strands of the link.

Since the caulks 11 may not be of absolutely uniform dimensions, it is possible that the caulks at the welding point will not always occupy the same positions and the link may be canted to one side or the other when pressed against these caulks. To allow for such canting and also to allow for any variations in height or depth of the link, the block 61 is provided with a floating support. As clearly shown in Fig. 1, the block has sliding engageemnt with a pair of bolts 65 which depend from opposite ends of a lever 66 pivoted on an operating arm 67. Springs 68 are interposed between the lever 66 and the block 61 so that when the block is forced downwardly by the lever 67 the springs will permit it to yield and hence will limit the pressure that it can apply to force the side strands of the link into contact with the caulks 11. Also, if the link is canted in one direction or the other the block 61 may swing on the axis of lever 66 to accommodate itself to the position of the link.

The lever 67 is raised and lowered by means of a cam 70 fixed to the shaft 24. The arm 67 is pivoted at one end to a bracket 71 rising from the main frame, and pivoted to the opposite end of the arm 67 is a rod 72 which at its lower end carries a fork 73 that straddles the adjacent end of the shaft 24. A roller 74 on this fork engages a groove 75 in the cam 70. The free end of the lever 67 may be guided by a slotted upstanding member 76 on the frame 14 and the spring 50 may be connected to the member 76.

The means, shown in Figs. 1-4, for intermittently feeding the caulks, comprises a pair of plungers 85 and 86, one for each guide 39 and 40. That portion of each plunger which enters the lower rectangular end of the guide is preferably insulated from its operating means particularly when two fixed electrodes 17 and 18 of opposite polarity are used. There are magazines 87 and 88 disposed at right angles to the guides and in communication with the guides at the lower ends thereof. Caulks slide out of the magazines into the guides when the plungers are withdrawn and are forced upwardly in the guides upon the advance stroke of the plungers. Springs 89 and 90 on the guides bear against the lowermost caulks to keep the column of caulks in the guides from dropping during retraction of the plungers. The plungers are operated in timed relation to the rest of the mechanism by a cam 91 on shaft 24 which is arranged to oscillate an arm 92 fixed to a shaft 93 journalled in the bracket 32. Also fixed to shaft 93 are two arms 94 and 95, respectively. Arm 94 is connected by a rod 96 to a lever 97 pivoted to the plunger 85. The lever 97 may be pivoted on a stud 98 carried by an arm 99 secured to the lower end of the guide 39. Similarly, arm 95 is connected by a rod 100, to a lever 101 which is pivoted to a stud 102 and the plunger 86, respectively.

In operation, as the cam 91 swings the arm 92 clockwise, the plungers 85 and 86 will be advanced, raising the column of caulks in each guide. In this position the columns of caulks will be held by springs 89 and 90 when the plungers are retracted by a reverse swing of arm 92. However, the plungers will remain in raised position until the welds are made so as to assist in taking the thrust of the block 61. In other words, I do not depend solely upon the clamping friction of the oscillating and fixed electrodes to hold the slugs in welding position. As soon as the plungers are retracted to the position shown in Fig. 4, a caulk will drop out of each magazine into the adjacent guide into position to be advanced up through the guide upon the next forward movement of the plunger.

The operation of the machine is as follows: By means of the Geneva drive the sprocket wheel 16 is intermittently rotated to bring successive links 10 to a position just above the welding point. At the same time caulks 11 are fed upwardly to welding position between electrodes 17 and 42 on one hand, and, electrodes 18 and 43, on the other. When in welding position these caulks are spaced from the link 10 to which they are to be welded. The electrodes 42 and 43 and the block 61 are then operated to clamp the caulks against the electrodes 17 and 18 and the link against the caulks, respectively, as shown in Fig. 1, in position ready for the application of the welding current. Electrodes 17 and 42 are connected to one pole and the electrodes 18 and 43 to the other pole of a source of welding current which is then applied by any suitable means and a flow is thus established from one pair of electrodes to the other through the caulks, the side strands of the link, the ends of the link, and the intervening block or neutral electrode 61, thereby welding the caulks to their respective side strands. It will be noted that the current passes serially through the two weld joints. Either of the pairs of electrodes 17 and 18, and 42 and 43 may be disconnected from the welding circuit. As soon as the welds have been completed cams 46 and 55 operate to oscillate the electrodes 42 and 43 to the position shown in Fig. 4, so that they will stand clear of the caulks 11 which are now welded to the link. At the same time cam 70 raises the block 61 permitting the chain to rise with the caulks attached thereto, thereby clearing the electrodes 17 and 18. Then the Geneva motion operates to withdraw the welded link and bring a new link into welding position.

If desired, and preferably, the welding current may be passed in parallel through the two weld joints. In such case the two electrodes 17 and 18 are replaced by a single electrode 105 Fig. 10 connected to one pole, and an electrode 106 corresponding in mechanical function to the block 61 of Fig. 1 is connected by a flexible lead 107 Fig. 10 to the opposite pole of the source of welding current, so that the current flow takes place through each joint into or out of this electrode and through the single electrode 105. In this case the electrodes 42 and 43 may be neutral. The electrode 105 may be neutral and the current passed through electrodes 42 and 43 and 106. In other respects, the machine may be the same as that shown.

It will be obvious that the flare of the caulks welded to the chain is controlled by the angle between the bottom faces of the grooves 39 and 40 and that these faces define a truncated wedge the longitudinal axis of which makes a slight angle with the direction of travel of the chain. If the caulks were to be welded to a flat link, the guides would be supported on the surface of a central wedge member having inclined faces corresponding to the flaring desired, and the axis of the wedge member and cooperating clamping members 42 and 43 would extend parallel to the direction of travel of the chain. It is obvious that the central member or guide faces therein may be parallel or otherwise related to each other depending upon the position and relation of the caulks desired in the finished caulked link. The magazine, guides and central wedge member may be secured together by welding and have been illustrated integrally connected in Fig. 5.

While I have shown and described a preferred embodiment of my invention and a preferred form of one element thereof, it will be understood that these disclosures are to be taken as illustrative and not limitative and that I reserve the right to make various changes in form, construction and arrangement of parts without departing from the spirit and scope of my invention as set forth in the following claims.

I claim:

1. A machine for welding caulks to a chain link, said machine comprising a truncated wedge adapted to support a caulk on each sloping face thereof at the apex of the wedge, a pair of electrodes disposed respectively at opposite sides of the wedge, means for moving said electrodes into engagement with the caulks to clamp the same against the wedge, a third electrode adapted to clamp the chain link against the caulks with the side strands of the link engaging said caulks respectively, and means for supplying welding current to the electrodes to weld the two caulks simultaneously to the link.

2. A machine for welding caulks to a chain link, said machine comprising a truncated wedge adapted to suport a caulk on each sloping face thereof at the apex of the wedge, a pair of electrodes disposed respectively at opposite sides of the wedge, means for moving said electrodes into engagement with the caulks to clamp the same against the wedge, a third electrode adapted to clamp the chain link against the caulks with the side strands of the link engaging said caulks respectively, said third electrode having a laterally and vertically yielding bearing whereby it may adapt itself to any variations in height of the caulks, and means for supplying welding current to the electrodes to weld the two caulks simultaneously to the link.

3. A machine for welding caulks to a curb link, said machine comprising a truncated wedge adapted to support a caulk on each sloping face thereof at the apex of the wedge, a pair of electrodes disposed respectively at opposite sides of the wedge, means for moving said electrodes against the caulks to clamp the same against the wedge, a third electrode mounted normally clear of said apex to permit of introducing the curb link therebetween, means for depressing the third electrode to clamp the link against the caulks with the side strands of the link engaging said caulks respectively, said caulks being oppositely inclined to parallel the side strands of the link and said third electrode having oppositely inclined shoulders to parallel and bear upon said side strand, and means for supplying welding current to the electrodes to weld the two caulks simultaneously to the link.

4. A machine for welding caulks to a curb link, said machine comprising a truncated wedge adapted to support a caulk on each sloping face thereof at the apex of the wedge, a pair of electrodes disposed respectively at opposite sides of the wedge, means for moving said electrodes against the caulks to clamp the same against the wedge, a third electrode mounted normally clear of said apex to permit of introducing the curb link therebetween, means for depressing the third electrode to clamp the link against the caulks with the side strands of the link engaging said caulks respectively, said caulks being oppositely inclined to parallel the side strands of the link and said third electrode having oppositely inclined shoulders to parallel and bear upon said side strands, the third electrode being also adapted to yield vertically and laterally in its mounting so as to adapt itself to variations in height of the caulks, and means for supplying welding current to the electrodes to weld the two caulks simultaneously to the link.

5. A machine for welding a plate-like caulk to each side strand of a curb link, said machine comprising a wedge-shaped support, means for resiliently supporting the curb link above the apex of the support with a side strand of the link above each sloping face of the support, means for supporting a caulk on each sloping face of the support at said apex with an edge of each caulk paralleling the adjacent side strand of the link, a pair of electrodes, means for moving said electrodes into engagement with the caulks to clamp the same against the support, a third electrode above the link, means for depressing the third electrode to clamp the chain link against the caulks with the side strands of the link engaging said caulks respectively, and means for supplying welding current to the electrodes to weld the two caulks simultaneously to the link.

6. A machine for welding caulks to a chain link, said machine comprising a wedge-shaped support consisting of a pair of fixed electrodes insulated from each other in a plane passing through the apex of the support, means for supporting a caulk on each sloping slide face of the support at the apex thereof, a movable electrode opposite each sloping face of the support, means for moving the movable electrodes into engagement with the caulks to clamp the same against said support, a neutral electrode normally spaced from the apex of the support to permit of introducing the chain link therebetween, means for moving said electrode toward the support to clamp the chain link against the caulks with the side strands of the link engaging said caulks respectively, and means for connecting the electrodes clamping one of caulks to one pole of a source of welding current and the electrodes clamping the other of said caulks to the opposite pole of said source, whereby welding current will flow from one caulk to the other through the side strands and said neutral electrode so as to weld the two caulks simultaneously to the link.

7. A machine for welding caulks to a curb link, said machine comprising a wedge-shaped support consisting of a pair of electrodes insulated from each other in a plane passing through the apex of the support, means for yieldingly supporting the link above the support with a side strand of the link over each sloping face of the support, means for feeding a caulk up each of the sloping faces to a welding position and in a direction normal to the adjacent side strand, a movable electrode opposite each of said faces, means for moving the movable electrodes into engagement with the caulks to clamp the same against said support, a neutral electrode normally spaced above the link, means for depressing said electrode to clamp the link against the caulks with the side strands of the link engaging said caulks respectively, and means for connecting one pole of a source of welding current to the electrodes clamping one of the caulks and the other pole to the electrodes clamping the other caulk.

8. A machine for welding a caulk to each opposite side strand of a curb link, said machine comprising a fixed electrode in the form of a wedge-shaped support, means for feeding a caulk up each sloping face of the support to a welding position at the apex of the support, a movable electrode at each side of the support, means for moving the movable electrodes into engagement with the caulks to clamp the same against the support, a third electrode adapted to clamp the curb link against the caulks with the side strands of the link engaging said caulks respectively, the direction of feed of the caulks being normal to the side strands to which they are to be welded, and means for connecting said third electrode to one pole of a source of welding current and the other electrodes together with the support to the other pole of said source of welding current, whereby both caulks will be simultaneously welded to the chain link.

9. A machine for welding caulks to the links of a chain, said machine comprising a wedge-shaped support, means for intermittently feeding the chain lengthwise of the support so as to bring successive links to a welding position directly above the support with a strand of the link over each sloping face of the support, a tubular guide on each sloping face of the support, means for intermittently feeding caulks up each guide to bring successive caulks to welding position on each face of the support immediately below the link, a pair of movable electrodes, means for operating said electrodes to clamp the caulks when in welding position against the support, a vertically movable electrode, means for depressing the latter electrode to clamp the link in welding position against the caulks, and driving mechanism for operating all of said means in mutually timed relation.

10. A machine for welding a caulk to each side strand of a chain link, said machine comprising means for securing the caulks in welding position, said means including a plurality of relatively movable electrodes adapted to space and clamp the caulks, another electrode adapted to clamp the link in welding position with the side strands of the link engaging the caulks respectively, and means for supplying welding current to the electrodes to weld the caulks simultaneously to the link.

11. A machine for welding a caulk to each side strand of a curb link, said machine comprising means for feeding each caulk to welding position with an outer edge thereof parallel to the side strand to which it is to be welded, a plurality of electrodes, means for relatively moving the electrodes to clamp the caulks, means to press the link against the caulks with the side strands thereof engaging the caulks respectively, and means for connecting the electrodes to a source of welding current in such relation that the welding current will pass serially through the joints between the caulks and the side strands.

12. A machine for welding a caulk to each side strand of a curb link, said machine comprising means for feeding each caulk to welding position with an outer edge thereof parallel to the side strand to which it is to be welded, a plurality of electrodes, means for relatively moving the electrodes to clamp the caulks, an auxiliary electrode operable to clamp the link against the caulks, means for operating the auxiliary electrode, and means for connecting said auxiliary electrode to one pole of a source of welding current and the other electrodes to the other pole of said source whereby current will pass in parallel through the joints between the caulks and side strands.

13. A machine for welding a pair of caulks simultaneously to opposite strands of a chain link, said machine comprising a tubular guide for each caulk extending in a direction normal to the strand to which the caulk is to be welded, means for feeding each caulk through the guide to a welding position, a side and the outer face of each guide being cut away at the welding position, a recessed electrode adapted to form a continuation of each guide at the welding point, an auxiliary electrode operable to clamp the link against the caulks with the latter engaging the side strands of the link respectively, means for operating the auxiliary electrode, means for passing welding current through the electrodes to cause simultaneous welding of the caulks to the link, and means for withdrawing the electrodes from the link and caulks after the welds have been made.

14. A machine for welding caulks to a chain link, said machine comprising a truncated wedge adapted to support a caulk on each sloping face thereof at the apex of the wedge, a pair of clamping members disposed respectively at opposite sides of the wedge, means for moving said clamping members into engagement with the caulks to clamp the same against the wedge, a third clamping member adapted to clamp the chain link against the caulks with the side strands of the link engaging said caulks respectively, and means for passing a welding current through the joints between the caulks and link to weld the two caulks simultaneously to the link.

15. A machine for welding caulks to a chain link, said machine comprising a truncated wedge adapted to support a caulk on each sloping face thereof at the apex of the wedge, a pair of clamping members disposed respectively at opposite sides of the wedge, means for moving said clamping members into engagement with the caulks to clamp the same against the wedge, a third clamping member adapted to clamp the chain link against the caulks with the side strands of the link engaging said caulks respectively, said third clamping member having a laterally and vertically yielding bearing whereby it may adapt itself to any variations in height of the caulks, and means for passing a welding current through the joints between the caulks and link to weld the two caulks simultaneously to the link.

16. A machine for welding caulks to a curb link, said machine comprising a truncated wedge adapted to support a caulk on each sloping face thereof at the apex of the wedge, a pair of clamping members disposed respectively at opposite sides of the wedge, means for forcing said clamping members against the caulks to clamp the same against the wedge, a third clamping member mounted normally clear of said apex to permit of introducing the curb link therebetween, means for depressing the third clamping member to clamp the link against the caulks with the side strands of the link engaging said caulks respectively, said caulks being oppositely inclined to parallel the side strands of the link and said third clamping member having oppositely inclined shoulders to parallel and bear upon said side strand, and means for passing a welding current through the joints between the caulks and link to weld the two caulks simultaneously to the link.

17. A machine for welding caulks to a curb link, said machine comprising a truncated wedge adapted to support a caulk on each sloping face thereof at the apex of the wedge, a pair of clamping members disposed respectively at opposite sides of the wedge, means for forcing said clamping members against the caulks to clamp the same against the wedge, a third clamping member mounted normally clear of said apex to permit of introducing the curb link therebetween, means for depressing the third clamping member to clamp the link against the caulks with the side strands of the link engaging said caulks respectively, said caulks being oppositely inclined to parallel the side strands of the link and said third clamping member having oppositely inclined shoulders to parallel and bear upon said side strands, the third clamping member being also adapted to yield vertically and laterally in its mounting so as to adapt itself to variations in height of the caulks, and means for passing a welding current through the joints between the caulks and link to weld the two caulks simultaneously to the link.

18. A machine for welding a plate-like caulk to to each side strand of a curb link, said machine comprising a wedge-shaped support, means for supporting the curb link above the apex of the support with a side strand of the link above each sloping face of the support, means for supporting a caulk on each sloping face of the support at said apex with an edge of each caulk paralleling the adjacent side strand of the link, a pair of clamping members, means for moving said clamping members into engagement with the caulks to clamp the same against the support, a third clamping member above the link, means for depressing the third clamping member to clamp the chain link against the caulks with the side strands of the link engaging said caulks respectively, and means for passing a welding current through the joints between the caulks and link to weld the two caulks simultaneously to the link.

19. A machine for welding caulks to the links of a chain, said machine comprising a wedge-shaped support, means for intermittently feeding the chain lengthwise to the support so as to bring successive links to a welding position directly above the support with a strand of the link over each sloping face of the support, a tubular guide on each sloping face of the support, means for intermittently feeding caulks up each guide to bring successively caulks to welding position on each face of the support immediately below the link, a pair of movable clamping members, means for operating said clamping members to clamp the caulks when in welding position against the support, a vertically movable clamping member, means for depressing the latter to clamp the link in welding position against the caulks, and driving mechanism for operating all of said means in mutually timed relation.

20. A machine for welding a caulk to each side strand of a chain link, said machine comprising means for holding the caulks in welding position, said means including a member for spacing said caulks at a distance equal to the distance between said side strands, movable clamping members for clamping said caulks against said spacing member, another clamping member adapted to clamp the link in welding position with the side strands of the link engaging the caulks respectively, and means for passing a welding current through the joints between the link and caulks to weld the caulks simultaneously to the link.

21. A machine for welding a pair of caulks simultaneously opposite sides of a chain link, said machine comprising mechanism for feeding the caulks to a welding position, means for guiding the caulks as they are fed, said means being adapted to prevent displacement of the caulks in any direction other than that in which they are fed, a supporting member at the welding position forming part of said guiding means, opposed clamping members for clamping the caulks on said support, an auxiliary clamping member operable to press the link into welding position with each side strand thereof engaging a caulk, means for operating the auxiliary clamping member in timed relation to said opposed clamping members, means for passing a welding current through the caulks and link, and means for withdrawing the clamping members from the link and caulks after the welds have been made.

22. A machine for welding a pair of caulks simultaneously to opposite sides of a chain link, said machine comprising mechanism for feeding the caulks to a welding position, means for guiding the caulks as they are fed, said means being adapted to prevent displacement of the caulks in any direction other than that in which they are fed, a support at the welding position forming part of said guiding means, opposed clamping members, mechanism for causing relative movement of said clamping members to clamp the caulks on said support, an auxiliary clamping member operable to press the link into welding position with each side strand thereof engaging a caulk, means for operating the auxiliary clamping member in timed relation to said opposed clamping members, said feeding mechanism being adapted to support the caulks against the thrust of said auxiliary clamping member, means for passing a welding current through the caulks and link, and means for withdrawing the clamping members from the link and caulks after the welds have been made.

23. A machine for welding a pair of caulks simultaneously to opposite strands of a chain link, said machine comprising a guide for each caulk extending in a direction normal to the strand to which the caulk is to be welded, means for feeding each caulk through the guide to a welding position, the guide terminating at a point adjacent to the welding position, a support having a groove adapted to form a continuation of the guides at the welding point, means operable to clamp the link against the caulks with the latter engaging the side strands of the link respectively, and means for passing welding current through the joint between said caulks and link to cause simultaneous welding of the caulks to the link.

24. A machine for welding a caulk to a chain link, said machine comprising a guide for the caulk, means for feeding the caulk through the guide to a welding position, the guide terminating at a point adjacent the welding position, a support having a groove adapted to form a continuation of the guide at the welding point, means for exerting pressure on the caulk against the bottom face of the groove when the caulk has reached the welding position, means adapted to clamp the link against the caulk, and means for passing welding current through the joint between the caulk and link.

JOHN R. REYBURN.